United States Patent
Kashani et al.

(10) Patent No.: US 11,163,645 B2
(45) Date of Patent: Nov. 2, 2021

(54) APPARATUS AND METHOD OF CONTROL FLOW INTEGRITY ENFORCEMENT UTILIZING BOUNDARY CHECKING

(71) Applicant: Denso Corporation, Kariya (JP)

(72) Inventors: Ameer Kashani, Southfield, MI (US); Gopalakrishnan Iyer, Santa Clara, CA (US)

(73) Assignee: DENSO CORPORATION

(*) Notice: Subject to any disclaimer, the term of this patent is extended or adjusted under 35 U.S.C. 154(b) by 106 days.

(21) Appl. No.: 16/578,455

(22) Filed: Sep. 23, 2019

(65) Prior Publication Data
US 2021/0089400 A1 Mar. 25, 2021

(51) Int. Cl.
G06F 11/36 (2006.01)
G06F 11/14 (2006.01)
G06F 21/54 (2013.01)

(52) U.S. Cl.
CPC ........ G06F 11/143 (2013.01); G06F 11/1492 (2013.01); G06F 11/3668 (2013.01); G06F 21/54 (2013.01); G06F 2201/865 (2013.01)

(58) Field of Classification Search
CPC ............... G06F 11/143; G06F 11/1492; G06F 2201/865; G06F 11/3466; G06F 11/3471; G06F 11/3668; G06F 21/52; G06F 21/54
See application file for complete search history.

(56) References Cited

U.S. PATENT DOCUMENTS

| | | | |
|---|---|---|---|
| 8,510,596 B1 | 8/2013 | Gupta et al. | |
| 8,924,782 B2 | 12/2014 | Locasto et al. | |
| 9,471,461 B2* | 10/2016 | Rhee | G06F 11/3466 |
| 2003/0135847 A1* | 7/2003 | Gouriou | G06F 9/468 717/158 |
| 2010/0070678 A1* | 3/2010 | Zhang | G06F 9/45558 711/6 |
| 2011/0271148 A1* | 11/2011 | Eigler | H01F 10/32 714/45 |
| 2011/0296385 A1* | 12/2011 | Wielaard | G06F 9/45558 717/124 |
| 2019/0102251 A1 | 4/2019 | Iyigun et al. | |
| 2019/0108036 A1* | 4/2019 | Texeira | G06F 9/461 |
| 2020/0125497 A1* | 4/2020 | Shi | G06F 12/0893 |
| 2020/0218803 A1* | 7/2020 | Otsuki | G06F 11/07 |
| 2020/0226035 A1* | 7/2020 | Li | G06F 16/188 |

* cited by examiner

*Primary Examiner* — Joseph O Schell
(74) *Attorney, Agent, or Firm* — Dickinson Wright PLLC

(57) ABSTRACT

A computer device includes a memory. The computer device also includes at least one processor configured to execute a process and manage the memory for the process. The processor is further configured to execute one or more program instructions associated with an application, reach control flow transfer for the one or more program instructions, unwind a call stack associated with the one or more program instructions in response to a failure to meet a target control flow, identify an offending function call, and rewrite the offending function call. The rewritten function call includes a memory operation boundary check.

20 Claims, 3 Drawing Sheets

APPARATUS AND METHOD OF CONTROL FLOW INTEGRITY ENFORCEMENT UTILIZING BOUNDARY CHECKING

TECHNICAL FIELD

The present disclosure relates to control flow integrity as related to software.

BACKGROUND

Most vulnerabilities are exploited by attackers changing the normal control flow of an application to perform arbitrary malicious activities with privileges of the exploited application. Control flow integrity (CFI) is a security mechanism that disallows changes to the original control flow graph of a compiled binary code, making it significantly harder to perform such attacks.

SUMMARY

According to one embodiment, a computer device includes a memory. The computer device also includes at least one processor configured to execute a process and manage the memory for the process. The processor is further configured to execute one or more program instructions associated with an application, reach control flow transfer for the one or more program instructions, unwind a call stack associated with the one or more program instructions in response to a failure to meet a target control flow, identify an offending function call, and rewrite the offending function call. The rewritten function call includes a memory operation boundary check.

According to a second embodiment, a method of managing memory for a process executing on a processor that includes executing one or more program instructions associated with an application, reaching control flow transfer for the one or more program instructions, unwinding a call stack associated with the one or more program instructions in response to a failure to meet a target control flow, identifying an offending function call, and rewriting the offending function call, wherein the rewritten function call includes a memory operation boundary check.

According to a third embodiment, a computer device in a vehicle includes a memory and at least one processor configured to execute a process and manage the memory for the process. The processor is configured to execute one or more program instructions associated with an application. The processor is further configured to reach control flow transfer for the one or more program instructions, unwind a call stack associated with the one or more program instructions in response to a failure to meet a target control flow, identify an offending function call and a data size limit of registers in memory associated with the offending function call, and rewrite the offending function call that includes a memory operation boundary check.

DETAILED DESCRIPTION

Figure 1:
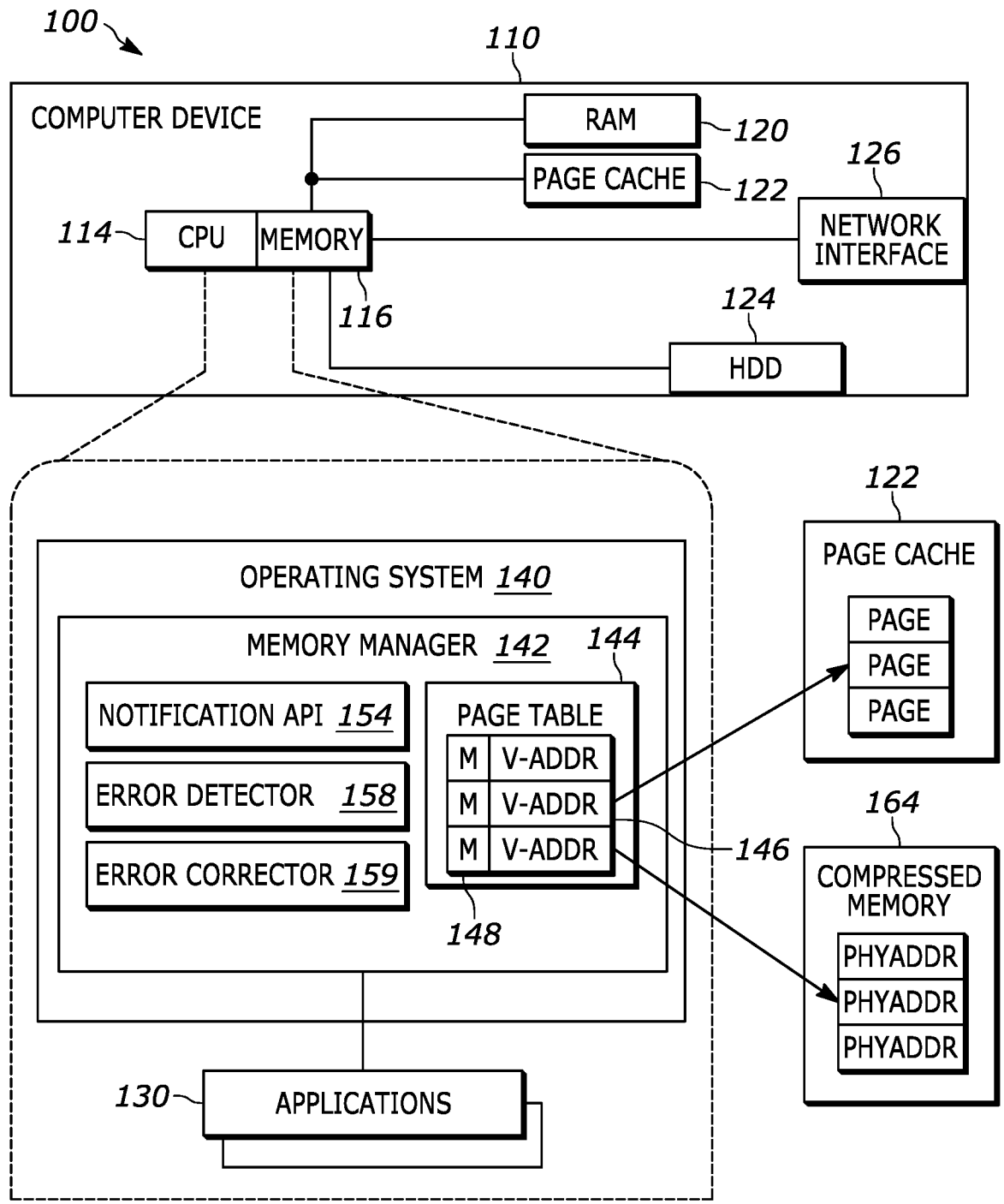
FIG. 1 is a diagram of an example computer system for detecting errors in a portion of memory allocated to a process in accordance with an implementation of the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Memory corruption may occur in computing systems that utilize software written in low-level languages, such as C or C++, for example. This is because such languages by default do not compile in data validation checks on memory reads or writes. For instance, compiled C code may not include any verifications to prevent data from being written outside of a region of memory allocated to a data buffer. Such an out-of-bounds access may be referred to as a buffer overflow or a buffer overrun.

When a process executes compiled code, a stack of data is allocated to the process as a block of memory. When a function is called by the code being executed, a new frame is pushed onto this stack. The new frame includes parameters being passed to the function, local data variables for the function, and a return address of where to continue execution once the function completes. When the function is complete, the frame is popped off the stack, and the return address is placed in the program counter to resume program flow. The return address is typically the instruction of the compiled code immediately after where the function was called.

A stack buffer overflow is a specific type of buffer overflow which may be used to alter program flow. For instance, an attacker may engineer a buffer overrun of a local variable on the stack that is formed to cause the return address to be overwritten with a jump to malicious code. This is one example of how an attacker may exploit omissions in data validation inherent in certain programming languages to hijack control flow of a program being executed on the computing system.

Control flow integrity (CFI) techniques may be used to detect some kinds of memory corruption but remain limited in response capability. CFI operates by first tracing all possible execution paths in code or a program to construct a control flow graph (CFG), and then by enforcing at runtime that program flow adheres to the control flow graph. CFI enforcement checks may be implemented in the code as a form of security that prevents the control flow of the code from deviating from the control flow graph, making it significantly harder to perform attacks that alter control flow and perform arbitrary malicious activities (e.g., malware, viruses, Trojan horses, spyware, etc.) with privileges arising from an exploited application. CFI techniques may thus monitor and preserve control transfers and/or program flows within a computer environment. CFI techniques may use a reference monitor (e.g., inline or external) and function transitions of code that are passed through the reference monitors and compared against a ground truth CFI graph to determine anomalous or deviating behaviors. CFI techniques may identify faults that arise from innocent or natural causes, including environmental radiation (e.g., electric and magnetic fields, etc.), random noise, signal errors, or part failure. More importantly, CFI techniques may detect faults that arise from an intentional act, such as from operating on malicious program inputs provided by the user. A typical CFI violation handling results in halting of execution, and re-execution of the program with a fresh state. Such a handling mechanism, however, fails to eliminate adversarial access to the vulnerability and it furthermore degrades availability of the system by allowing persistent exploitation.

In an improved CFI technique, a program may still be instrumented with initial CFI enforcement instructions. However, upon detection of a CFI violation, instead of halting or restarting execution, the program call stack may instead be unwound from the failure point to identify the offending function that caused the violation. The offending function may then be modified (i.e., rewritten) to include instructions that perform a boundary check on the target buffer that was overrun in the offending function. With the offending function rewritten, execution may be resumed from a point before the offending function was called using the previous program call stack state. Significantly, as the rewritten function now includes a boundary check, the malformed data leading to the initial violation will be prevented from causing another violation. Accordingly, the memory corruption is prevented in the resumed execution, and the attacker cannot complete the overflow vulnerability. Thus, rather than simply halting executing and abruptly stopping execution of an application, the application may be modified and resumed, thereby recovering from the attack while also preventing future errors or issues at that point in the application.

Referring now to FIG. 1, an example computer system 100 includes a computer device 110. The computer device 110 may be, for example, any mobile or fixed computer device including but not limited to a desktop or laptop or tablet computer, a cellular telephone, a gaming device, a mixed reality or virtual reality device, a music device, a television, a navigation system, a camera, a personal digital assistant (PDA), a handheld device, electronic control unit, any other computer device having wired and/or wireless connection capability with one or more other devices, or any other type of computerized device capable of generating a video-out signal.

The computer device 110 may include a central processing unit (CPU) 114 that executes instructions stored in a memory 116. For example, the CPU 114 may execute an operating system 140 and one or more applications 130. The operating system 140 and the applications 130 may each be associated with one or more processes that may be assigned a process identifier and allocated a portion of memory 116.

Memory 116 may be configured for storing data and/or computer-executable instructions. The computer-executable instructions may be defining and/or associated with an operating system 140 and/or applications 130. The CPU 114 may execute operating system 140 and/or applications 130. Memory 116 may represent one or more hardware memory devices accessible to computer device 110. An example of memory 116 can include, but is not limited to, a type of memory usable by a computer, such as random access memory (RAM), read only memory (ROM), tapes, magnetic discs, optical discs, volatile memory, non-volatile memory, and any combination thereof. Memory 116 may store local versions of applications being executed by CPU 114. In the illustrated example, memory 116 includes RAM 120, a page cache 122, a hard drive 124, and a network interface 126. The RAM 120 may be a hardware component such as one or more dual in-line memory modules (DIMM). The page cache 122 may be a portion of the RAM 120 used to store pages originating in secondary storage such as the hard drive 124. The hard drive 124 may represent any secondary storage. The hard drive 124 may have larger capacity but slower access time than the RAM 120. The network interface 126 may also be used as a secondary storage, for example, as a network drive.

The CPU 114 may include one or more processors for executing instructions. An example of CPU 114 can include, but is not limited to, any processor specially programmed as described herein, including a controller, microcontroller, application specific integrated circuit (ASIC), field programmable gate array (FPGA), graphics processing unit (GPU), system on chip (SoC), or other programmable logic or state machine. The CPU 114 may include other processing components such as an arithmetic logic unit (ALU), registers, and a control unit. The CPU 114 may include multiple cores and may be able to process different sets of instructions and/or data concurrently using the multiple cores to execute multiple threads.

The operating system 140 may include instructions (such as applications 130) stored in memory 116 and executable by the CPU 114. The operating system 140 may include a memory manager 142 for allocating memory to processes. For example, the memory manager 142 may implement a virtual memory system. The memory 116 may include a limited amount of RAM 120. The processes executed by the CPU 114 may request more memory than the available amount of RAM 120. A large portion of the requested memory, however, may remain idle for substantial amounts of time. The memory manager 142 may use virtual memory to satisfy requests for memory by allocating virtual memory addresses 146 to processes. The virtual memory addresses 146 may then be associated with respective to physical memory addresses in the RAM 120 or pages, which may be stored in other logical and physical components such as compressed memory 164 or hard drive 124. In an implementation, the virtual memory may include a page table 144 that stores the location of the memory contents (e.g., a pointer) for each virtual memory address 146. In an implementation, the page table 144 may also store metadata 148 for detecting and correcting memory errors or corruption. For example, a set of metadata 148 may be associated with each virtual memory address 146 in page table 144.

A notification application programming interface (API) 154 or other type of software may allow a process to communicate with the memory manager 142 to configure some features of memory management for the process. In an implementation, the memory manager 142 may provide notifications regarding corrupted memory to a process or function. For example, the memory manager 142 may generate a notification when corrupted memory is detected. For instance, the memory manager 142 may throw an exception indicating that corrupted memory has been detected or a CFI violation has occurred. The process may indicate whether the process is handling the exception. If the memory manager 142 does not receive an indication that the process is handling the exception, the memory manager 142 may determine how to handle the exception (e.g., attempt recovery, terminate process, crash system). As another example of a notification, the memory manager 142 may generate a notification when corrupted data is corrected. Similar to the detection of corrupted memory, some processes may handle corrected memory in a particular manner. For example, the process may be able to regenerate the data rather than trust that the memory manager 142 has successfully corrected the corrupted memory. In other cases, a process may choose not to receive notification when corrupted memory is corrected.

An error detector 158 may be software or hardware to evaluate whether a function call has become corrupted. For example, the error detector 158 may recognize buffer errors by examining whether a buffer access exceeds a buffer capacity in memory 116. The error detector 158 may provide an indication to the notification API 154 when an error is detected. The error detector 158 may be configured to evaluate a function call when a function call is requested by a process. Accordingly, the error detector 158 may ensure that processes are receiving validated data. Additionally, or alternatively, the error detector 158 may periodically evaluate function calls to determine whether the function calls have become corrupted. For example, the error detector 158 may use idle processes to check for errors or may select functions that have been in memory for relatively long times. For example, for an application that is running in the background, it may identify applications by their type and determine a normal runtime for that application (e.g., a runtime threshold). If the normal runtime is exceeded, the error detector 158 may determine that an error may exist in the application. For example, if a certain application is expected to run for only one minute, and the application runs for a time that exceeds one minute, the error detector 158 may determine that the function has become corrupt. In other examples, a watchdog may be utilized to determine if the application does not receive an expected response or "heartbeat" when monitored.

An error corrector 159 may attempt to correct a corrupted function call when detected by the error detector 158. The error corrector 159 may deterministically modify code of the function call. For example, the error corrector 159 may sequentially modify code to test for errors. For example, the error corrector 159 may analyze each line of code (or a grouping of lines of code) to modify and consequentially test each modified line of code for errors. The error corrector 159 may then use the error detector 158 to evaluate whether the modified function call matches the original function call.

Figure 2:
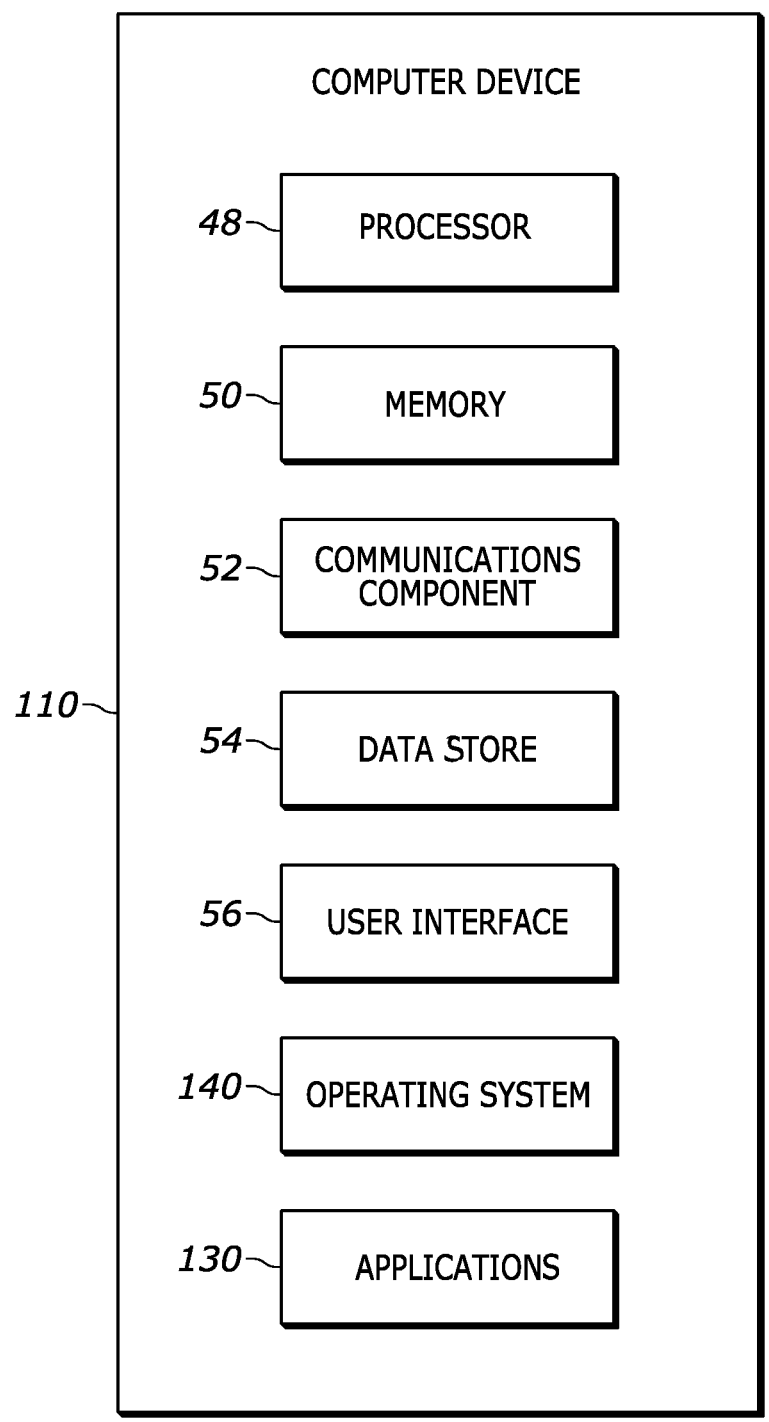
FIG. 2 is a schematic block diagram of an example computer device in accordance with an implementation of the present disclosure.

Referring now to FIG. 2, illustrated is an example computer device 110 in accordance with an implementation, including additional component details as compared to FIG. 1. In one example, computer device 110 may include processor 48 for carrying out processing functions associated with one or more of components and functions described herein. Processor 48 can include a single or multiple set of processors or multi-core processors. Moreover, processor 48 can be implemented as an integrated processing system and/or a distributed processing system. In an implementation, for example, processor 48 may include CPU 114.

In an example, computer device 110 may include memory 50 for storing instructions executable by the processor 48 for carrying out the functions described herein. In an implementation, for example, memory 50 may include memory 116. CPU 114 may also include specialized instructions for carrying out the functions described (e.g., examining function calls by invoking these specialized instructions to check a control flow transfer for validity/correctness). These checks may also be performed by a reference monitor included as a part of error detector 158 and instrumentations compiled into the operating system 140 or applications 130.

Further, computer device 110 may include a communications component 52 that provides for establishing and maintaining communications with one or more parties utilizing hardware, software, and services as described herein. Communications component 52 may carry communications between components on computer device 110, as well as between computer device 110 and external devices, such as devices located across a communications network and/or devices serially or locally connected to computer device 110. For example, communications component 52 may include one or more buses, and may further include transmit chain components and receive chain components associated with a transmitter and receiver, respectively, operable for interfacing with external devices.

Additionally, computer device 110 may include a data store 54, which can be any suitable combination of hardware and/or software, that provides for mass storage of information, databases, and programs employed in connection with implementations described herein. For example, data store 54 may be a data repository for operating system 140 and/or applications 130. The data store may include memory 116.

Computer device 110 may also include a user interface component 56 operable to receive inputs from a user of computer device 110 and further operable to generate outputs for presentation to the user. User interface component 56 may include one or more input devices, including but not limited to a haptic input, keyboard, a number pad, a mouse, a touch-sensitive display, a digitizer, a navigation key, a function key, a microphone, a voice recognition component, any other mechanism capable of receiving an input from a user, or any combination thereof. Further, user interface component 56 may include one or more output devices, including but not limited to a display, a speaker, a haptic feedback mechanism, a printer, any other mechanism capable of presenting an output to a user, or any combination thereof.

In an implementation, user interface component 56 may transmit and/or receive messages corresponding to the operation of operating system 140 and/or applications 130. In addition, processor 48 may execute operating system 140 and/or applications 130, and memory 50 or data store 54 may store them.

The computer device 110 may be located inside of a vehicle. For example, the computer device 110 may be part of a vehicle computer system that includes a navigation system, audio head unit, vehicle safety system, and other vehicle component. In such an example, the computer device 110 may interact with other vehicle components utilizing a vehicle communication network, such as a vehicle bus (e.g., controller area network (CAN) bus, etc.).

Figure 3:
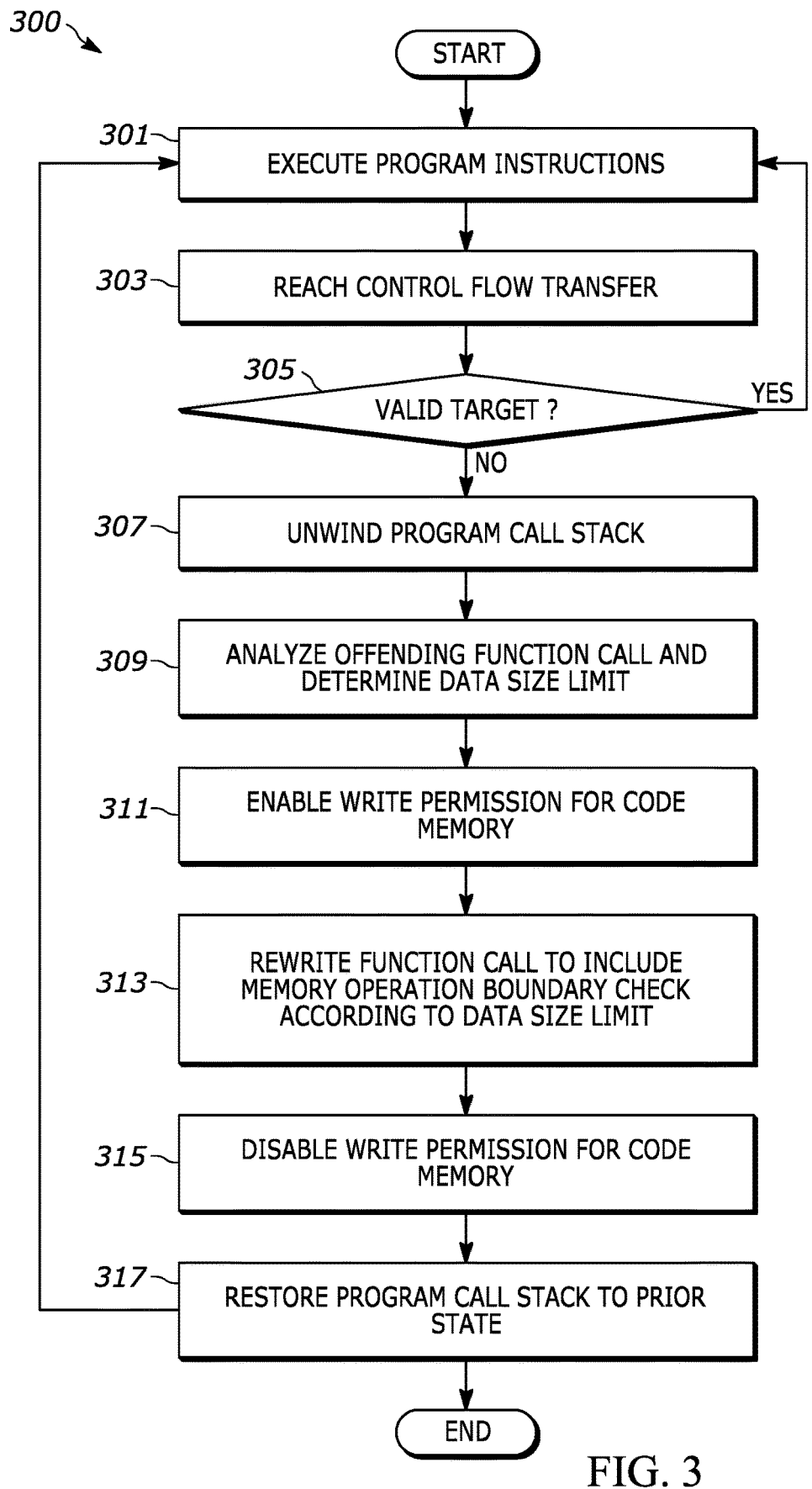
FIG. 3 is a flowchart 300 of an example method of control flow integrity (CFI) enforcement in accordance to an implementation of the present disclosure.

FIG. 3 is a flowchart 300 of an example method of CFI enforcement in accordance with an implementation of the present embodiment. In an example, the example method may be performed by the computer device 110 loading an application 130 or other computer code instructions into the memory 116 for execution by the CPU 114.

At operation 301, the computer device 110 executes program instructions. The program instructions may be any type of compiled code targeted for execution by the CPU 114 of the computer device 110. In an illustrative example, the program instructions include instructions that are compiled from a low-level language, such as C or C++, that lack data validation checks on memory reads or writes. The computer device 110 may execute any given program upon startup of the computer device 110, or when loading a new application. The computer device 110 may automatically execute the code based on code or instructions. In another example, the code may be executed based on a user manually running the code. Such examples include, double clicking a program, typing instructions to execute code, touching an application icon on a touch interface, activating an icon based on any input device, activating vehicle functions, etc. Other input interfaces may also be utilized to execute a program.

At operation 303, program flow of the code being executed reaches a control flow transfer. The control flow transfer may be a machine-code instruction of the program instructions that transfers control of the program from one code location to another. Examples of such instructions include call instructions that transfer program flow to a subroutine location (and also save the address of the instruction following the call on the stack for later use by a return instruction), return instructions that allow execution to resume back to the stored location on the stack upon completion of execution of the subroutine, conditional jump instructions that optionally transfer control to another instruction location based on satisfaction of one or more test conditions, and unconditional jump instructions that unconditionally transfer control to the target location regardless of condition, etc.

At operation 305, the system determines whether the destination instruction of the control flow transfer is a valid target code instruction. The target code instruction may be deemed valid if the control flow transfer is attempting (or causing) a transfer of program flow that is consistent with what is expected for the program. The fault may arise from innocent or natural causes, including environmental radiation, random noise, signal errors, or from man-made causes. Or, the fault may arise from an intentional acts such as operating on malicious program inputs provided by the user. In one embodiment, to identify whether the target is valid, the system may include hooks into various function calls that are subject to CFI enforcement. The system may also store a CFG model representing normal program flows derived from the code or program instructions being operated on computer device 110. The error detector 158 may utilize hooks to intercept function calls and perform a comparison of the program flow resulting from execution of pending control flow transfer with the normal program flow of the CFG model. However, if the target is not valid, control passes to operation 307. In one example, if the target is consistent with the CFG model, the target is deemed valid and control returns to operation 301 to proceed with execution of the control flow transfer instruction. For instance, during program execution, whenever a machine-code instruction transfers control, it targets a valid destination, as determined by a CFG created ahead of time. If the program flow does not match the CFG model, then the error detector 158 or the system may determine if the fault occurred based on the reach of the control flow transfer.

At operation 307, the system unwinds the program call stack. In an example, the system may pop the current stack frame off the program call stack, based on an assumption that program execution was at a consistent stable point before the current offending function was called and that the stack is undamaged at that point in execution. Machine code disassembly may be performed on the offending function of the program call stack, and the memory operators/operands within may be identified. The offending function code may be rewritten to eliminate the memory corruption vulnerability (i.e., buffer overflow), as opposed to leaving it untouched and risking repetition of the fault condition, as discussed in more detail below. For example, the application or program may be disassembled from machine language into an assembly language. The error corrector 159 may be utilized to dissemble the machine language into the assembly language. The error corrector 159 may then analyze the lines of code (e.g., individually or grouping them collectively) to determine memory operation and the data size limits for the lines of code.

At operation 309, the system analyzes the offending function code to determine a data size limit. For instance, the system (e.g., error detector 158) may perform code analysis on the instructions to identify memory access operations and operands. The system (e.g., error detector 158) may also perform code analysis on the instructions to identify instantiations of variables, as the instantiations may indicate the bounds of the variables that are being defined. As one possibility, the data size limit may be extracted by static, dynamic, or symbolic analysis of the program instructions. In an example, the system may emulate program execution of the function to identify the buffer leading to memory corruption. In another example, the system may search the program instructions for buffer initialization code that includes the data size limit as a parameter, register, or immediate value. In some implementations, to perform the code analysis the system may disassemble the machine instruction code of the offending function into an assembly representation or other representation that is more suitable for higher-level analysis.

In another example, machine code disassembly may be performed on the offending function, as well as on the memory operators/operands within the offending function that are identified. The operands are traced to their instantiations, thereby determining their data size limits. The boundary check is composed of machine instructions implementing a size comparison based on those determined data size limits. These instructions are added in-line with the existing instructions by shifting them or otherwise relocating them to create space for the boundary checks. The reason for rewriting the code is to eliminate the memory corruption vulnerability (i.e., buffer overflow), as opposed to leaving it untouched and risking repetition of the fault condition. Thus, the overall system reliability and availability may be increased in a hostile operational environment. In one example, the error corrector 159 may be utilized to rewrite the code to eliminate the memory corruption.

At operation 311, the system enables write permission to the memory storing the code instructions to be modified. In many implementations, memory segments that include executable code are marked read-only by the memory manager 142 to allow the code to be read but to prevent the code from being altered. This is generally advantageous, as the write access restrictions prevent accidental or intentional tampering with or altering of the program instructions once they are loaded into memory. However, this restriction on write access to the code instructions may impede the implementation of runtime program improvements that are identified by CFI enforcement methods. In one example, the permission model assigned may enforce write access restrictions and not allow modification of permission during computing device operation. The system may also direct the memory manager 142 to temporarily mark the memory storing the code with both read and write permissions, thereby allowing the code to be rewritten in scenarios when an offending function is identified.

At operation 313, the system rewrites the function to include memory operation boundary checks according to the data size limit. The rewritten function includes boundary checks that ensure that write operations to the data buffer of the function are bounded to the size of the buffer. The system may trace the fault to determine the size of the data buffer. The system may ensure that the data size limit is reduced for the rewritten function call by analyzing the data size limit for memory as associated with the rewritten function call. To assist in generation of the boundary check code instructions, the system (e.g., the error corrector 159) may utilize a code template with the data size limit and memory operand location that may be inserted to generate the rewritten code. The system may then inject the rewritten code into the existing machine code to prevent future CFI errors. For instance, the new instructions may be added in-line with the existing instructions by shifting the existing code or by otherwise relocating the existing code to create space for the new boundary check instructions. By rewriting the code, the memory corruption vulnerability (i.e., buffer overflow) may be eliminated. This avoids the possibility of repetition of the fault condition. Thus, overall system reliability and availability may be increased. The data size limit may be traced from the offending function call to initialization. For example, the data size limit may be extracted by static, dynamic, or symbolic analysis of program instructions. The system (e.g., the error detector 158) may determine the offending function call and disassemble program instructions or emulate program execution to identify the buffer leading to memory corruption. The system may search within memory or program instructions for buffer initialization code that includes the data size limit as a parameter, register, or immediate value. The recovered data size limit and memory operand location is inserted into a code template to generate the modified code. In another example, the system (e.g. the error corrector 159) may test the modified code to verify the functional equivalence of the modified instructions in comparison to the original instructions. The system may apply a variety of software tests (e.g. unit tests, regression tests, integration tests, formal verification tests, hardware-in-the-loop tests, coding rule tests, etc.) to the modified program, re-execute the modified program with benign or malformed inputs under an emulation environment, and so forth in order to determine the absence of errors in the modified code. In response to any errors, the system may alter the modifications (e.g. using random mutations, genetic algorithms, etc.) and repeat testing until passing criteria are met. The system may determine the offending function call and disassemble program instructions or emulate program execution to identify the buffer leading to memory corruption. The system may search within memory or program instructions for buffer initialization code that includes the data size limit as a parameter, register, or immediate value. The recovered data size limit and memory operand location may be inserted into a code template to generate the modified code. The system may rewrite the function call during a run-time operation, as opposed to halting operation.

At operation 315, the system disables write permissions to the memory storing the code instructions. This resumes the prevention by the memory manager 142 of write access to the code, thereby once again preventing the code loaded into memory from being written to by accident or by malicious users. As such, the write permission being disabled may prevent the ability to modify code by unauthorized users. When the permission is disabled, it prevents the ability to modify entries in the memory or storage, which includes creating files, deleting files, renaming files, etc.

At operation 317, the system restores the program call stack to the prior state. For instance, the program stack, program counter and other CPU registers, and other program state may be reset to a state consistent with execution of the program instructions before the offending function was executed. After operation 317, control passes to operation 301 to resume execution of the code. With the offending function rewritten, execution can be resumed from a point before the offending function was called using the previous program call stack state. As the rewritten function now includes a boundary check, the violation that occurred will be prevented from causing another violation. Accordingly, the memory corruption is prevented in the resumed execution. Thus, rather than simply halting executing and abruptly stopping execution of an application, the application may be modified and resumed from the recovered state, thereby recovering from the attack while also preventing future errors or issues at that point in the application. As such, the program may resume execution with the modified function that was made after the function call was rewritten to include memory operation boundary checks according to the data size limit. The program may then resume execution from the start, which may allow the boundary checks. Execution may occur in a recovered state.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A computer device, comprising:
   a memory; and
   at least one processor configured to execute a process and manage the memory for the process, wherein the at least one processor is configured to:
   execute one or more program instructions associated with an application;
   reach control flow transfer for the one or more program instructions;
   unwind a call stack associated with the one or more program instructions in response to a failure to meet a target control flow;
   identify an offending function call; and
   rewrite the offending function call, wherein the rewritten function call includes a memory operation boundary check configured to verify that write operations to a data buffer of the rewritten function are bounded to a size of the data buffer utilizing at least a code template.

2. The computer device of claim 1, wherein the processor is further configured to enable write permission for the memory in response to the failure to meet the target control flow.

3. The computer device of claim 2, wherein the processor is further configured to disable write permission for the memory in response to the failure to meet the target control flow.

4. The computer device of claim 1, wherein the process is configured to occur during runtime operation.

5. The computer device of claim 1, wherein the processor is further configured to determine a data size limit of the offending function call.

6. The computer device of claim 5, wherein the memory operation boundary check is associated with the data size limit.

7. A method of managing memory for a process executing on a processor, comprising:
   executing one or more program instructions stored in memory and associated with an application;
   reaching control flow transfer for the one or more program instructions;
   unwinding a call stack associated with the one or more program instructions in response to a failure to meet a target control flow;
   identifying an offending function call; and
   rewriting the offending function call, wherein the rewritten function call includes a memory operation boundary check configured to verify that write operations to a data buffer of the rewritten function are bounded to a size of the data buffer utilizing at least a code template.

8. The method of claim 7, wherein the method further includes the step of restoring a program call stack to a prior state, wherein the program call stack is unwound from a failure point to identify the offending function.

9. The method of claim 7, wherein the method further includes the step of enabling write permission for the memory in response to the failure to meet the target control flow.

10. The method of claim 9, wherein the method further includes the step of disabling writing permission for the memory in response to the failure to meet the target control flow.

11. The method of claim 7, wherein the method occurs during runtime operation.

12. The method of claim 7, wherein the processor is further configured to determine a data size limit of the offending function call.

13. The method of claim 12, wherein the memory operation boundary check is associated with the data size limit.

14. A computer device in a vehicle, comprising:
   a memory; and
   at least one processor configured to execute a process and manage the memory for the process, wherein the at least one processor is configured to:
   execute one or more program instructions associated with an application;
   reach control flow transfer for the one or more program instructions;
   unwind a call stack associated with the one or more program instructions in response to a failure to meet a target control flow;
   identify an offending function call and a data size limit of registers in memory associated with the offending function call; and
   rewrite the offending function call, wherein the rewritten function call includes a memory operation boundary check configured to verify that write operations to a data buffer of the rewritten function are bounded to a size of the data buffer utilizing at least a code template.

15. The computer device of claim 14, wherein the processor is configured to restore a program call stack to a prior state, wherein the program call stack is unwound from a failure point to identify the offending function.

16. The computer device of claim 14, wherein the processor is further configured to enable write permission for the memory in response to the failure to meet the target control flow.

17. The computer device of claim 16, wherein the processor is further configured to disable write permission for the memory in response to the failure to meet the target control flow.

18. The computer device of claim 14, wherein the process is configured to occur during runtime operation.

19. The computer device of claim 14, wherein the processor is further configured to determine a data size limit of the offending function call.

20. The computer device of claim 19, wherein the memory operation boundary check is associated with the data size limit.

* * * * *